United States Patent
Vo. et al.

(10) Patent No.: US 10,696,891 B2
(45) Date of Patent: Jun. 30, 2020

(54) GENERATING AND MAINTAINING CONDUCTIVITY OF MICROFRACTURES IN TIGHT FORMATIONS WITH INVERTED MICROEMULSIFIED ACID TREATMENT FLUIDS

(71) Applicant: Halliburton Energy Services, Inc., Houston, TX (US)

(72) Inventors: Loan K. Vo., Houston, TX (US); Philip D. Nguyen, Houston, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 3 days.

(21) Appl. No.: 15/308,687

(22) PCT Filed: Jul. 8, 2014

(86) PCT No.: PCT/US2014/045653
§ 371 (c)(1),
(2) Date: Nov. 3, 2016

(87) PCT Pub. No.: WO2016/007130
PCT Pub. Date: Jan. 14, 2016

(65) Prior Publication Data
US 2017/0152432 A1    Jun. 1, 2017

(51) Int. Cl.
*E21B 43/267*    (2006.01)
*C09K 8/64*    (2006.01)
(Continued)

(52) U.S. Cl.
CPC .................. *C09K 8/64* (2013.01); *C09K 8/74* (2013.01); *C09K 8/80* (2013.01); *C09K 8/805* (2013.01);
(Continued)

(58) Field of Classification Search
None
See application file for complete search history.

(56) References Cited

U.S. PATENT DOCUMENTS 2,802,531 A * 8/1957 Cardwell ................. C09K 8/64
166/307
3,603,400 A * 9/1971 Son, Jr. .................... C09K 8/64
166/308.4
(Continued)

FOREIGN PATENT DOCUMENTS

WO    2015041649 A1    3/2015
WO    2016007130 A1    1/2016

OTHER PUBLICATIONS

Oliveira et al., Invert Emulsion Acid for Simultaneous Acid and Proppant Fracturing, OTC 24332, 2013.
(Continued)

*Primary Examiner* — Angela M DiTrani Leff
(74) *Attorney, Agent, or Firm* — McGuire Woods, LLP.

(57) ABSTRACT

Methods including (a) introducing an invert microemulsified acid ("IMA") treatment fluid into a subterranean formation at a rate and pressure sufficient to create or enhance a fracture in a first treatment interval therein, wherein the IMA treatment fluid comprises a surfactant, a non-aqueous external phase, and aqueous dispersed phase droplets, and wherein the non-aqueous external phase further comprises micro-proppant particulates and at least a portion of the aqueous dispersed phase droplets further comprise an acid; (b) destabilizing the IMA treatment fluid in the fracture, thereby exposing the acid, wherein the micro-proppant particulates form a proppant pack in the fracture and the acid etches a channel in the fracture and/or adjacent to the fracture.

18 Claims, 1 Drawing Sheet

(51) Int. Cl.
  *C09K 8/74* (2006.01)
  *C09K 8/80* (2006.01)
  *C09K 8/82* (2006.01)
  *E21B 43/25* (2006.01)
  *E21B 43/26* (2006.01)

(52) U.S. Cl.
  CPC ............... *C09K 8/82* (2013.01); *E21B 43/25* (2013.01); *E21B 43/26* (2013.01); *E21B 43/267* (2013.01)

(56) References Cited

U.S. PATENT DOCUMENTS

| | | | |
|---|---|---|---|
| 4,359,391 A * | 11/1982 | Salathiel | C09K 8/36 166/271 |
| 4,566,539 A * | 1/1986 | Perlman | E21B 43/26 166/307 |
| 5,034,140 A | 7/1991 | Gardner et al. | |
| 5,633,220 A | 5/1997 | Cawiezel et al. | |
| 6,849,582 B2 * | 2/2005 | Grainger | C09K 8/64 166/307 |
| 2009/0200033 A1 | 8/2009 | Kakadjian et al. | |
| 2011/0308817 A1 * | 12/2011 | Ravensbergen | E21B 34/102 166/382 |
| 2012/0205107 A1 | 8/2012 | Rickman et al. | |
| 2013/0000900 A1 * | 1/2013 | Kalgaonkar | C09K 8/035 166/279 |
| 2013/0161003 A1 * | 6/2013 | Makarychev-Mikhailov | C09K 8/685 166/280.1 |
| 2013/0192837 A1 | 8/2013 | Curtis et al. | |
| 2013/0284437 A1 | 10/2013 | Nguyen et al. | |
| 2013/0312962 A1 | 11/2013 | Weaver et al. | |
| 2013/0333892 A1 * | 12/2013 | McClung, IV | E21B 43/26 166/308.3 |
| 2014/0034309 A1 | 2/2014 | Saini et al. | |
| 2014/0367100 A1 * | 12/2014 | Oliveira | C09K 8/80 166/280.1 |
| 2015/0068744 A1 | 3/2015 | Welton et al. | |
| 2015/0096750 A1 * | 4/2015 | Loiseau | C09K 8/36 166/280.2 |
| 2015/0102629 A1 | 7/2015 | Vo et al. | |
| 2016/0090523 A1 | 3/2016 | Ravi et al. | |
| 2016/0264849 A1 * | 9/2016 | Oliveira | C09K 8/36 |

OTHER PUBLICATIONS

International Search Report and Written Opinion for PCT/US2014/045653 dated Mar. 24, 2015.

* cited by examiner

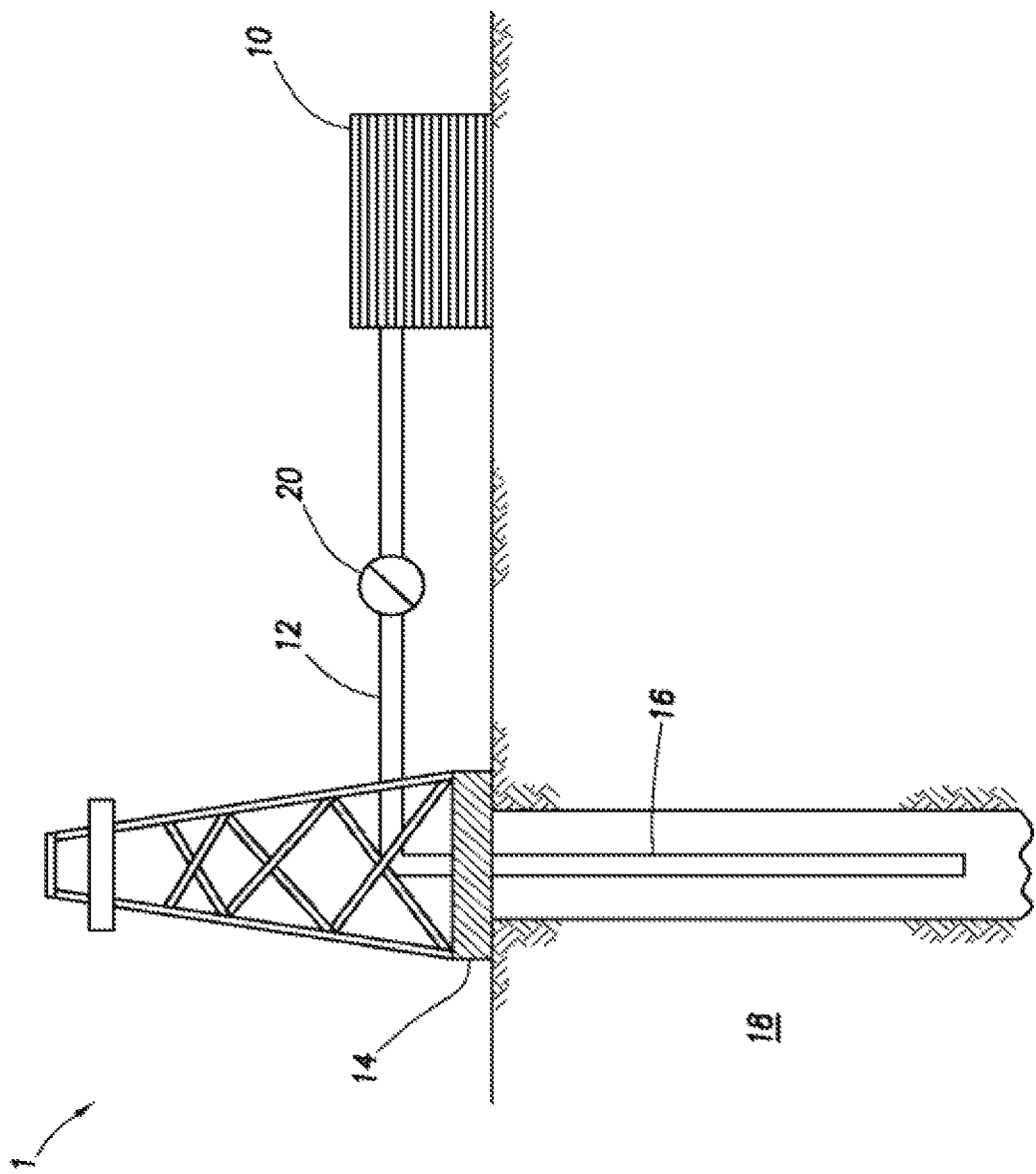

GENERATING AND MAINTAINING CONDUCTIVITY OF MICROFRACTURES IN TIGHT FORMATIONS WITH INVERTED MICROEMULSIFIED ACID TREATMENT FLUIDS

BACKGROUND

Generating and maintaining the conductivity of microfractures in a tight formation using inverted microemulsified acid treatment fluids.

Hydrocarbon producing wells (oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") at a rate and pressure sufficient to break down the formation and create one or more fractures therein. Typically, particulate solids, such as graded sand, are suspended in a portion of the treatment fluid and then deposited into the fractures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces which act as conductive paths through which fluids produced from the formation may flow. The degree of success of a stimulation operation depends, at least in part, upon the ability of the proppant pack to permit the flow of fluids through the interconnected interstitial spaces between proppant particulates.

In the case of stimulating low permeability formations, such as shale reservoirs or tight-gas sands, increasing fracture complexity, as opposed to proppant pack conductivity, during stimulation may further enhance the production of the formation. Low permeability formations, such as those described herein, tend to have a naturally occurring network of multiple, interconnected fractures referred to as "fracture complexity." As used herein, the term "low permeability formation" refers to a formation that has a matrix permeability of less than 1,000 microDarcy (equivalent to 1 milliDarcy). As used herein, the term "ultra-low permeability formation" refers to a formation that has a matrix permeability of less than 1 microDarcy (equivalent to 0.001 milliDarcy). As used herein, unless otherwise stated, the term "fracture" or "fractures" will refer collectively to micro-sized fractures (referred to herein as "microfractures") and fractures having larger openings (referred to herein as "macrofractures").

Fracture complexity may be enhanced by stimulation (e.g., fracturing) operations to create new or enhance (e.g., elongate or widen) existing fractures. In some cases, the newly formed fractures may remain open without the assistance of proppant or micro-proppant particulates due to shear offset of the formation forming the fractures (i.e., the formation in which the fracture is formed does not close perfectly, thereby leaving channels). In other cases, the fractures may be held open by proppant or micro-proppant particulates, depending on the size of the fracture. The inclusion of proppant or micro-proppant particulates in the fractures—new or natural—may increase the conductivity of a low permeability formation.

In some cases, subterranean treatment operations (e.g., stimulation, proppant placement, micro-proppant placement, and the like), may be supplemented subsequently with enhanced oil recovery techniques. Such enhanced oil recovery techniques may operate to enhance the conductivity of fractures. One such technique is acidizing, which involves injecting an acid (e.g., hydrochloric acid) into a subterranean formation in order to etch channels or create microfractures in the face of the formation and/or within an existing macrofracture or microfracture, thereby enhancing the conductivity of the formation. The acid may create a branched, dendritic-like network of channels through which produced fluids may flow. Acidizing may supplement or enhance the conductivity and production of the formation. However, acidizing treatments are typically performed subsequent to stimulation operations and require additional treatment fluids, operation time, storage capacity, and the like.

BRIEF DESCRIPTION OF THE DRAWINGS

The following FIGURE is included to illustrate certain aspects of the embodiments described herein, which should not be viewed as exclusive embodiments. The subject matter disclosed is capable of considerable modifications, alterations, combinations, and equivalents in form and function, as will occur to those skilled in the art and having the benefit of this disclosure.

The FIGURE depicts an embodiment of a system configured for delivering the inverted microemulsified acid treatment fluids and pad fluids of the embodiments described herein to a downhole location.

DETAILED DESCRIPTION

The embodiments described herein relate to generating and maintaining the conductivity of microfractures in tight formations using inverted, microemulsified acid treatment fluids. Specifically, the embodiments described herein relate to simultaneously fracturing and acidizing a subterranean formation to create and/or enhance at least one microfracture or macrofracture therein using an inverted, microemulsified acid ("IMA") treatment fluid. The IMA treatment fluids described herein are used to fracture a formation and also to release an acid capable of in situ acidizing. Micro-proppant, proppant particulates, and/or other solids may be used to prop open the fractures. As used herein, the term "microfracture" refers to a natural or secondary discontinuity or fracture in a portion of a subterranean formation creating a flow channel having a sub-microDarcy diameter size. As used herein, the term "macrofracture" refers to a discontinuity or fracture in a portion of a subterranean formation creating a flow channel, the flow channel generally having a diameter or flow size opening greater than about the size of a microfracture. In some cases, a fracture may have, for example, an asterix shape, such that the main body of the fracture is the size of a macrofracture but the tips of the projections are small enough to qualify as microfractures. In such cases, the main body of the fracture is used to determine the type of fracture and, thus, the asterix shaped fracture would be referred to as a macrofracture. The microfractures and macrofractures may be channels, perforations, holes, or any other ablation within the formation.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, businessrelated, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

Increasing fracture complexity in subterranean formations, particularly in tight subterranean formations, may increase the conductivity and productivity of the formation. The permeability of a formation is a measure of the formation's resistance to through-flow fluid. Thus, low permeability formations require considerable applied pressure in order to flow fluid through the formation, as compared to formations having higher permeabilities.

Examples of such low permeability formations include, but are not limited to, shale reservoirs and tight-gas sands. Shale reservoirs are sources of hydrocarbons comprising complex, heterogeneous rock with low permeability. Shale reservoirs are known to have permeabilities of about 0.001 milliDarcy ("mD") ($9.869233 \times 10^{-19}$ $m^2$) or less, and even about 0.0001 mD ($9.869233 \times 10^{-20}$ $m^2$) or less. Tight-gas sands are low permeability formations that produce mainly dry natural gas and may include tight-gas carbonates, tight-gas shales, coal-bed methane, and the like. Tight-gas sands may have permeabilities as low as about 1 mD ($9.869233 \times 10^{-16}$ $m^2$) or less, and even as low as about 0.01 mD ($9.869233 \times 10^{-18}$ $m^2$) or less.

In some embodiments disclosed herein, a composition is provided comprising an inverted, microemulsified acid ("IMA") treatment fluid comprising a surfactant, a non-aqueous external phase, and aqueous dispersed phase droplets. The non-aqueous external phase may further comprise micro-proppant particulates, and at least a portion of the aqueous dispersed phase droplets comprise an acid. The IMA treatment fluids described herein are stable microemulsions. As used herein, the term "stable microemulsion" and all of its variants refers to a microemulsion having droplets that do not generally coalesce (i.e., combine to form larger droplets), flocculate (i.e., aggregate together), or cream (i.e., rise to the top of the emulsion) at a particular temperature and/or pressure. As used herein, the term "droplet" refers to an isolated fluid phase having a specific shape, which may be any shape including, but not limited to, a cylindrical shape, a spherical shape, a tubular shape, an irregular shape, and the like, and any combination thereof. Thus, the IMA treatment fluids described herein may be characterized as having relatively evenly aqueous dispersed droplets therein. As described herein, the IMA treatment fluids may have aqueous dispersed phase droplets with an average diameter in the range of from a lower limit of about 1 nm, 10 nm, 20 nm, 30 nm, 40 nm, and 50 nm to an upper limit of about 100 nm, 90 nm, 80 nm, 70 nm, 60 nm, and 50 nm, encompassing any value and subset therebetween. In other embodiments, the IMA treatment fluids may have aqueous dispersed phase droplets with an average diameter in the range of from a lower limit of about 10 nm, 12.5 nm, 15 nm, 17.5 nm, 20 nm, 22.5 nm, 25 nm, 27.5 nm, and 30 nm to an upper limit of about 50 nm, 47.5 nm, 45 nm, 42.5 nm, 40 nm, 37.5 nm, 35 nm, 32.5 nm, and 30 nm, encompassing any value and subset therebetween.

The non-aqueous external phase fluid in the IMA treatment fluids may be any water-insoluble liquid that is capable of forming a stable emulsion with the aqueous base fluids and surfactants disclosed herein. Suitable non-aqueous external phase fluids may include, but are not limited to, an alkane, a cyclic alkane, an olefin, an aromatic organic compound, an aliphatic organic compound, a paraffin, a diesel, a mineral oil, a synthetic oil, a desulfurized hydrogenated kerosene, and the like, and any combination thereof. In some embodiments, the non-aqueous external phase fluid may be present in the IMA treatment fluids in an amount in the range of from a lower limit of about 1%, 2.5%, 5%, 7.5%, 10%, 12.5%, 15%, 17.5%, 20%, 22.5%, 25%, 27.5%, and 30% to an upper limit of about 60%, 57.5%, 55%, 52.5%, 50%, 47.5%, 45%, 42.5%, 40%, 37.5%, 35%, 32.5%, and 30% by weight of the IMA treatment fluid having no additives included therein, encompassing any value and subset therebetween.

The aqueous dispersed phase droplets for use in the IMA treatment fluids may include, but are not limited to, fresh water, saltwater (e.g., water containing one or more salts dissolved therein), brine (e.g., saturated salt water), seawater, and the like, and any combination thereof. Generally, the aqueous dispersed phase droplets may be from any source, provided that it does not contain components that may adversely affect the stability and/or performance of the IMA treatment fluids described herein. In some embodiments, the aqueous dispersed phase droplets may be present in the IMA treatment fluids in an amount in the range of from a lower limit of about 40%, 42.5%, 45%, 47.5%, 50%, 52.7%, 55%, 57.5%, 60%, 62.5%, 65%, 67.5%, and 70% to an upper limit of about 98%, 95%, 92.5%, 90%, 87.5%, 85%, 82.5%, 80%, 77.5%, 75%, 72.5%, and 70% by weight of the IMA treatment fluid having no additives included therein, encompassing any value and subset therebetween.

The surfactant for use in forming the IMA treatment fluids may be used to form an interfacial film between the non-aqueous external phase and the aqueous dispersed phase droplets. In some embodiments, a co-surfactant may further be included in the IMA treatment fluids, the co-surfactant used to ensure flexibility of the interfacial film, thus reducing interfacial tension and aiding the stability of the IMA treatment fluid emulsion.

Suitable surfactants for use in the IMA treatment fluids may include, but are not limited to, an anionic surfactant, a cationic surfactant, a zwitterionic surfactant, and the like, and any combination thereof. Specific examples of suitable surfactants may include, but are not limited to, a betaine, a sulfated alkoxylate, a sulfonated alkoxylate, an alkyl quarternary amine, an alkoxylated linear alcohol, an alkyl sulfonate, an alkyl aryl sulfonate, $C_{10}$-$C_{20}$ alkyldiphenyl ether sulfonate, an ether of alkylated phenol, a sodium dodecylsulfate, an alpha olefin sulfonate (e.g., sodium dodecane sulfonate, trimethyl hexadecyl ammonium bromide, and the like), an arginine methyl ester, an alkanolamine, an alkylenediamide, an alkyl ester sulfonate, an alkyl ether sulfonate, an alkyl ether sulfate, an alkali metal alkyl sulfate, a sulfosuccinate, an alkyl disulfonate, an alky aryl disulfonate, an alkyl disulfate, an alcohol polypropoxylated sulfate, an alcohol polyethoxylated sulfate, a taurate, an amine oxide, an alkylamine oxides, an ethoxylated amide, an alkoxylated fatty acid, an alkoxylated alcohol, an ethoxylated fatty amine, an ethoxylated alkyl amine, an alkylaminobetaine, a quaternary ammonium compound, and the like, any derivative thereof, and any combination thereof.

Suitable co-surfactants for use in the embodiments disclosed herein may include, but are not limited to, an alcohol, an alkyl alcohol, an aliphatic alcohol, an alicyclic alcohol, an unsaturated aliphatic alcohol, an unsaturated alicyclic alcohol, a polyhydric alcohol, an aromatic alcohol, an ethoxylated alcohol, a propoxylated alcohol, a glycol, a glycol ether, a polyglycol amine, a phenol, an ethoxylated phenol, a propoxylated phenol, and the like, and any combination thereof. Specific examples of suitable co-surfactants include, but are not limited to, methanol, ethanol, n-propanol, isopropanol, n-butanol, sec-butanol, isobutanol, t-butanol, benzyl alcohol, cyclohexanol, 2-ethyl hexanol, amine ethyl ethanolamine, cyclohexylamine, diethanolamine, diethylamine, diethylenetriamine, diethylethanolamine, di-isopropanolamine, di-isopropylamine, dimethylethanolamine, ethylene diamine, isopropylamine, monoethanolamine, monoisopropanolamine, morpholine, triethanolamine, triethylamine, tri-isopropanolamine, diethylene glycol, dipropylene glycol, ethylene glycol, polyethylene glycol, tripropylene glycol, triethylene glycol, propylene glycol, polypropylene glycol, polyglycol, hexylene glycol, glycerine, nonylphenol, nonylphenol ethoxylate, nonylphenol polyethylene, nonylphenol polyethylene ether, nonylphenoxy poly(ethyleneoxy)ethanol, tertiary-butyl alcohol, and the like, any derivative thereof, and any combination thereof.

In some embodiments, the surfactant may be present in an amount in the range of from a lower limit of about 0.5%, 1%, 2.5%, 5%, 7.5%, and 10%, 12.5%, and 15% to an upper limit of about 30%, 27.5%, 25%, 22.5%, 20%, 17.5%, and 15% by weight of the IMA treatment fluid and the co-surfactant may be present in an amount in the range of from a lower limit of about 0.5%, 1%, 2.5%, 5%, 7.5%, 10%, 12.5%, and 15% to an upper limit of about 30%, 27.5%, 25%, 22.5%, 20%, 17.5%, and 15% by weight of the IMA treatment fluid having no additives included therein, encompassing any value and subset therebetween. In some embodiments, the surfactant to co-surfactant ratio may be in the range of from an upper limit of about 3:1, 2.8:1, 2.6:1, 2.4:1, 2.2:1, and 2:1 to a lower limit of about 1:1, 1.2:1, 1.4:1, 1.6:1, 1.8:1, and 2:1, encompassing any value and subset therebetween.

The non-aqueous external phase of the IMA treatment fluid may further comprise micro-proppant particulates. As used herein, the term "micro-proppant particulates" and all of its variants (e.g., "micro-proppant") refers to particulates capable of holding fractures (e.g., microfractures) open after a hydraulic fracturing treatment and having a size in the range of from a lower limit of about 0.25 μm, 0.5 μm, 1 μm, 10 μm, 20 μm, 30 μm, 40 μm, 50 μm, 60 μm, 70 μm, and 80 μm to an upper limit of about 150 μm, 140 μm, 130 μm, 120 μm, 110 μm, 100 μm, 90 μm, and 80 μm, encompassing any value and subset therebetween. The micro-proppant particulates for use in the IMA treatment fluids described herein may be any material capable of propping open a fracture after hydraulic pressure is removed. Suitable materials for these micro-proppant particulates may include, but are not limited to, sand, bauxite, ceramic material, glass material, polymeric material (e.g., ethylene-vinyl acetate or composite materials), polytetrafluoroethylene material, nut shell pieces, a cured resinous particulate comprising nut shell pieces, seed shell pieces, a cured resinous particulate comprising seed shell pieces, fruit pit pieces, a cured resinous particulate comprising fruit pit pieces, wood, composite particulates, and the like, and any combination thereof. Suitable composite particulates may comprise a binder and a filler material, wherein suitable filler materials may include, but are not limited to, silica, alumina, fumed carbon, carbon black, graphite, mica, titanium dioxide, barite, metasilicate, calcium silicate, kaolin, talc, zirconia, boron, fly ash, hollow glass microspheres, solid glass, and the like, and any combination thereof. Suitable micro-proppant particulates for use in conjunction with the embodiments described herein may be any known shape of material, including substantially spherical materials, fibrous materials, polygonal materials (e.g., cubic materials), irregular materials, and the like, and any combinations thereof.

In some embodiments, the micro-proppant particulates may be present in the non-aqueous external phase of the IMA treatment fluids in an amount in the range of from a lower limit of about 0.01 pounds per gallon ("lb/gal"), 0.1 lb/gal, 0.5 lb/gal, 1 lb/gal, 1.25 lb/gal, 1.5 lb/gal, 1.75 lb/gal, 2 lb/gal, 2.25 lb/gal, 2.5 lb/gal, 2.75 lb/gal, 3 lb/gal, 3.25 lb/gal, 3.5 lb/gal, 3.75 lb/gal, 4 lb/gal, 4.25 lb/gal, 4.5 lb/gal, 4.75 lb/gal, 5 lb/gal, 5.25 lb/gal, and 5.5 lb/gal to an upper limit of about 10 lb/gal, 9.75 lb/gal, 9.5 lb/gal, 9.25 lb/gal, 9 lb/gal, 8.75 lb/gal, 8.5 lb/gal, 8.25 lb/gal, 8 lb/gal, 7.75 lb/gal, 7.5 lb/gal, 7.25 lb/gal, 7 lb/gal, 6.75 lb/gal, 6.5 lb/gal, 6.25 lb/gal, 6 lb/gal, 5.75 lb/gal, and 5.5 lb/gal of the IMA treatment fluid, encompassing any value and subset therebetween.

In some embodiments, the aqueous dispersed phase droplets of the IMA treatment fluids described herein include an acid. The acid may be any acid suitable in etching or otherwise forming channels in a formation to create or extend existing or new fractures. The acid may comprise organic acids, inorganic acids, derivatives thereof, or combinations thereof. Specific examples of suitable acids may include, but are not limited to, hydrochloric acid, hydrofluoric acid, formic acid, lactic acid, phosphoric acid, sulfamic acid, acetic acid, nitric acid, boric acid, hydrobromic acid, perchloric acid, citric acid, oxalic acid, uric acid, malic acid, and the like, any derivatives thereof, and any combination thereof. In some embodiments, the acid may be, alone or in combination with the previous examples, a chelating acid. Suitable chelating acids may include, but are not limited to, 1-glutamic acid, N,N,-diacetic acid, ethylenediaminetetraacetic acid, hydroxyethylethylenediaminetriacetic acid, nitrilotriacetic acid, ethanoldiglycine, diethylenetriaminepentaacetic acid, propylenediaminetetraacetic acid, ethylenediaminedi(o-hydroxyphenylacetic) acid, dicarboxymethyl glutamic acid tetrasodium salt, trisodium salt of methylglycinediacetic acid, a salt thereof (e.g., a sodium salt, a potassium salt, and the like) and the like, any derivative thereof, and any combination thereof.

In certain embodiments, the acid may be present in the aqueous dispersed phase droplets of the IMA treatment fluids in an amount in the range of from a lower limit of about 0.5%, 1%, 2%, 4%, 6%, 8%, 10%, 12%, 14%, 16%, 18%, and 20% to an upper limit of about 40%, 38%, 36%, 34%, 32%, 30%, 28%, 26%, 24%, 22%, and 20% by weight of the IMA treatment fluid having no additives included therein, encompassing any value and subset therebetween. Selection of a suitable acid may depend on a number of factors including, for example, the type of formation being treated, the aqueous and/or non-aqueous fluids forming the IMA treatment fluid, the percentage of acid being used, the type of treatment being performed in a subterranean formation, and the like. These and other interrelated factors that may additionally be considered in deciding how much of the acid compound to use, such as the composition of the formation, the temperature of the formation, the pressure of the formation, the particular fines and damage present in the formation (e.g., scale, skin, calcium carbonate, silicates, and the like), the particular acid used, metals the acid may contact, corrosion concerns, the expected contact time of the acid with the formation, and the like.

In some embodiments, in addition to the acid in the aqueous dispersed phase droplets, a low-molecular weight polymer may be included therein. As used herein, the term "low-molecular weight polymer" refers to a polymer having a molecular weight in the range of from a lower limit of about 500 daltons, 1000 daltons, 2000 daltons, 4000 daltons, 6000 daltons, 8000 daltons, 10,000 daltons, 12,000 daltons, 14,000 daltons, 16,000 daltons, 18,000 daltons, 20,000 daltons, 22,000 daltons, 24,000 daltons, and 26,000 daltons to a upper limit of about 50,000 daltons, 48,000 daltons, 46,000 daltons, 44,000 daltons, 42,000 daltons, 40,000 daltons, 38,000 daltons, 36,000 daltons, 34,000 daltons, 32,000 daltons, 30,000 daltons, 28,000 daltons, and 26,000 daltons, encompassing any value and subset therebetween. The low-molecular weight polymer may be included in the aqueous dispersed phase droplets to stabilize the droplets in the IMA treatment fluid, particularly at high temperatures. In some embodiments, the low-molecular weight polymer may include, but is not limited to, a polyacrylamide, a polyacrylate, a poly(2-acrylamido-2-methyl-1-propanesulfonic acid), a poly(2-acrylamido-2-methyl-1-propanesulfonic acid) copolymer, and any combination thereof. In certain embodiments, the low-molecular weight polymer may be present in the aqueous dispersed phase droplets of the IMA treatment fluids in an amount in the range of from a lower limit of about 0.01%, 0.1%, 0.5%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, 5.5%, 5.75%, 6%, 6.25%, 6.5%, 6.75%, 7%, and 7.25% to an upper limit of about 15%, 14.75%, 14.5%, 14.25%, 14%, 13.75%, 13.5%, 13.25%, 13%, 12.75%, 12.5%, 12.25%, 12%, 11.75%, 11.5%, 11.25%, 10.75%, 10.5%, 10.25%, 10%, 9.75%, 9.5%, 9.25%, 9%, 8.75%, 8.5%, 8.25%, 8%, 7.75%, 7.5%, and 7.25% by weight of the IMA treatment fluid having no additives included therein, encompassing any value and subset therebetween.

In some embodiments, the IMA treatment fluids described herein may be introduced into a subterranean formation at a rate and pressure sufficient to create or enhance a fracture in a first treatment interval therein (e.g., a microfracture or macrofracture). Once the fracture has been created or enhanced with the IMA treatment fluids, the IMA treatment fluid is destabilized within the fracture, thereby exposing the acid in at least a portion of the aqueous dispersed phase droplets and exposing the micro-proppant particulates in the non-aqueous external phase. The micro-proppant particulates may then form a proppant pack in the fracture and the exposed acid etches a channel in the fracture and/or adjacent to the fracture. As used herein, the term "channel" refers to a passage or tunnel in a subterranean formation through which a fluid (e.g., liquid and/or gas) may flow. In some embodiments, a second fracture is created or formed using the IMA treatment fluid at at least a second treatment interval, again destabilizing the IMA treatment fluid to form a proppant pack and etch channels in or adjacent to the fracture in the second treatment interval.

In other embodiments, the IMA treatment fluid itself may not be used to create or enhance a fracture in a first treatment interval in a subterranean formation. Rather, a pad fluid may be used in this manner. Thereafter, the IMA treatment fluid may be introduced into the fracture in the first treatment interval and thereafter destabilized therein to form a proppant pack and etch channels in or adjacent to the fracture in the first treatment interval. Additionally, the process of introducing the pad fluid, introducing the IMA treatment fluid, and destabilizing the IMA treatment fluid may be repeated at at least a second treatment interval in the subterranean formation. The pad fluid may be, among other things, any aqueous or non-aqueous fluid used in the IMA treatment fluid, as described herein. Suitable pad fluids may include, but are not limited to, oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater, brine, seawater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

The simultaneous fracturing and acidizing that is permitted with use of the IMA treatment fluids described herein may serve, among other times, to extend the effective fracture length compared to a two-step acidizing treatment, to extend the effective conductivity duration of the fracture, and the like. Moreover, the mere combination of the acid and micro-proppant particulates in the IMA treatment fluids may enhance fracture conductivity in low and ultra-low permeability formations and, ultimately, production of desired fluids from the formations.

In some embodiments, the non-aqueous external phase of the IMA treatment fluids may further comprise a tackifying agent. In some embodiments, the tackifying agent may be at least partially, or wholly, coated onto the micro-proppant particulates within the non-aqueous external phase. The tackifying agent in the non-aqueous external phase of the IMA treatment fluid, whether coated onto the micro-proppant particulates or freely existing therein (which may lead to some coating of the micro-proppant particulates by virtue of their proximity, but may not necessarily be the case) provides a number of benefits when deposited into a subterranean formation fracture, for example. The tackifying agent may serve to aid in the vertical distribution of the micro-proppant particulates in a fracture, help prevent fines migration or micro-proppant flowback, coat onto a fracture face and prevent micro-proppant embedment or other particulate embedment, protect the micro-proppant particulates and the formation from scale buildup and digenesis, enhance the clean-up or removal of water insoluble gelling agents from treatment fluids from the formation, and the like.

Suitable tackifying agents may include, but are not limited to, a polyacid (e.g., a dimer acid, a trimer acid, and the like), a dimer diamine, a trimer triamine, a hydrophobically modified polyethyleneimine, an acrylic acid polymer, an acrylic acid ester polymer, an acrylic acid derivative polymer, an acrylic acid homopolymer, an acrylic acid ester homopolymer (e.g., poly(methyl acrylate), poly(butyl acrylate), and poly(2-ethylhexyl acrylate)), an acrylic acid ester co-polymer, a methacrylic acid derivative polymer, a methacrylic acid homopolymer, a methacrylic acid ester homopolymer (e.g., poly(methyl methacrylate), poly(butyl methacrylate), and poly(2-ethylhexyl methacrylate)), an acrylamido-methyl-propane sulfonate polymer, an acrylamido-methyl-propane sulfonate derivative polymer, an acrylamido-methyl-propane sulfonate co-polymers, an acrylic acid/acrylamido-methyl-propane sulfonate co-polymer, any derivative thereof, and any combination thereof. In certain embodiments, the tackifying agent may be present in the non-aqueous external phase of the IMA treatment fluids in an amount in the range of from a lower limit of about 0.01%, 0.1%, 0.5%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, and 5.5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, and 5.5% by weight of the IMA treatment fluid having no additives included therein, encompassing any value and subset therebetween.

In some embodiments, an additive may be included in the pad fluid and/or IMA treatment fluids (i.e., in the external phase) described herein (collectively referred to simply as "treatment fluids"), the additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

In various embodiments, systems configured for delivering the treatment fluids (i.e., the pad fluids and the IMA treatment fluids) described herein to a downhole location are described. In various embodiments, the systems can comprise a pump fluidly coupled to a tubular, the tubular containing the treatment fluids described herein. It will be appreciated that while the system described below may be used for delivering either or both of the pad fluid and/or IMA treatment fluid, each treatment fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the micro-proppant particulates and/or the micro-proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

The FIGURE shows an illustrative schematic of a system that can deliver the treatment fluids of the present disclosure to a downhole location, according to one or more embodiments. It should be noted that while the FIGURE generally depicts a land-based system, it is to be recognized that like systems may be operated in subsea locations as well. As depicted in the FIGURE, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in the FIG. 1*n* the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in the FIGURE, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in the FIGURE.

Embodiments disclosed herein include:

Embodiment A

A method comprising: (a) introducing an invert microemulsified acid ("IMA") treatment fluid into a subterranean formation at a rate and pressure sufficient to create or enhance a fracture in a first treatment interval therein, wherein the IMA treatment fluid comprises a surfactant, a non-aqueous external phase, and aqueous dispersed phase droplets, and wherein the non-aqueous external phase further comprises micro-proppant particulates and at least a portion of the aqueous dispersed phase droplets further comprise an acid; (b) destabilizing the IMA treatment fluid in the fracture, thereby exposing the acid, wherein the micro-proppant particulates form a proppant pack in the fracture and the acid etches a channel in the fracture and/or adjacent to the fracture.

Embodiment A may have one or more of the following additional elements in any combination:

Element A1: Further comprising repeating steps (a) through (b) at at least a second treatment interval.

Element A2: Wherein the aqueous phase dispersed droplets have an average diameter in the range of from about 1 nm to about 100 nm.

Element A3: Wherein the non-aqueous external phase further comprises a tackifying agent.

Element A4: Wherein the non-aqueous external phase further comprises a tackifying agent that is at least partially coated onto the micro-proppant particulates.

Element A5: Wherein the IMA treatment fluid further comprises a co-surfactant.

Element A6: Further comprising a wellhead with a tubular extending therefrom and into the subterranean formation, and a pump fluidly coupled to the tubular, wherein step (a) comprises introducing the IMA treatment fluid through the tubular.

Element A7: Wherein at least a portion of the aqueous dispersed phase droplets further comprise a low-molecular weight polymer having a molecular weight in the range of between about 500 daltons to about 50,000 daltons.

By way of non-limiting example, exemplary combinations applicable to Embodiment A include: A with A1 and A3; A with A1 and A4; A with A2, A7, and A6; A with A4 and A7; A with A1 and A6; A with A2 and A3; A with A1, A2, and A5.

Embodiment B

A method comprising: (a) introducing a pad fluid into a subterranean formation at a rate and pressure sufficient to create or enhance a fracture in a first treatment interval therein; (b) introducing an invert microemulsified acid ("IMA") treatment fluid into the fracture in the first treatment interval, wherein the IMA treatment fluid comprises a surfactant, a non-aqueous external phase, and aqueous dispersed phase droplets, and wherein the non-aqueous external phase further comprises micro-proppant particulates and at least a portion of the aqueous dispersed phase droplets further comprise an acid; (c) destabilizing the IMA treatment fluid in the fracture, thereby exposing the acid, wherein the micro-proppant particulates form a proppant pack in the at least one fracture and the acid etches channels in the at least one fracture and/or adjacent to the at least one fracture.

Embodiment B may have one or more of the following additional elements in any combination:

Element B1: Further comprising repeating steps (a) through (c) at at least a second treatment interval.

Element B2: Wherein the aqueous phase dispersed droplets have an average diameter in the range of from about 1 nm to about 100 nm.

Element B3: Wherein the non-aqueous external phase further comprises a tackifying agent.

Element B4: Wherein the non-aqueous external phase further comprises a tackifying agent that is at least partially coated onto the micro-proppant particulates.

Element B5: Wherein the IMA treatment fluid further comprises a co-surfactant.

Element B6: Wherein at least a portion of the aqueous dispersed phase droplets further comprise a low-molecular weight polymer having a molecular weight in the range of between about 500 daltons to about 50,000 daltons.

By way of non-limiting example, exemplary combinations applicable to Embodiment B include: B with B1 and B6; B with B2, B4, and B5; B with B4 and B5; B with B1 and B2; B with B6 and B3; B with B1, B2, and B5; B with B3 and B4.

Embodiment C

A composition comprising: an invert microemulsified acid ("IMA") treatment fluid comprising a surfactant, a non-aqueous external phase, and aqueous dispersed phase droplets, wherein the non-aqueous external phase further comprises micro-proppant particulates and at least a portion of the aqueous dispersed phase droplets further comprise an acid.

Embodiment C may have one or more of the following additional elements in any combination:

Element C1: Wherein at least a portion of the aqueous dispersed phase droplets further comprise a low-molecular weight polymer having a molecular weight in the range of between about 500 daltons to about 50,000 daltons.

Element C2: Wherein the non-aqueous external phase further comprises a tackifying agent.

Element C3: Wherein the non-aqueous external phase further comprises a tackifying agent that is at least partially coated onto the micro-proppant particulates.

Element C4: Wherein the IMA treatment fluid further comprises a co-surfactant.

Element C5: Wherein the aqueous phase dispersed droplets have an average diameter in the range of from about 1 nm to about 100 nm.

By way of non-limiting example, exemplary combinations applicable to Embodiment C include: C with C1 and C3; C with C2, C4, and C5; C with C3 and C5; C with C1 and C3; C with C1, C4, and C5.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
(a) introducing an invert microemulsified acid ("IMA") treatment fluid into a subterranean formation at a rate and pressure sufficient to create or enhance a fracture in a first treatment interval therein,
wherein the subterranean formation has a permeability of about 0.001 milliDarcy or less,
wherein the IMA treatment fluid comprises a surfactant, a non-aqueous external phase, and aqueous dispersed phase droplets, and
wherein the non-aqueous external phase further comprises micro-proppant particulates and at least a portion of the aqueous dispersed phase droplets further comprise an acid;
(b) destabilizing the IMA treatment fluid in the fracture, thereby exposing the acid and the micro-proppant particulates,
wherein the micro-proppant particulates form a proppant pack in the fracture and the acid etches a channel in the fracture and/or adjacent to the fracture after the IMA treatment fluid is destabilized,
wherein the formed proppant pack increases the permeability of the subterranean formation,
wherein the micro-proppant particulates have a size of less than about 80 µm.

2. The method of claim 1, further comprising repeating steps (a) through (b) at least a second treatment interval.

3. The method of claim 1, wherein the aqueous phase dispersed droplets have an average diameter in the range of from about 1 nm to about 100 nm.

4. The method of claim 1, wherein the non-aqueous external phase further comprises a tackifying agent.

5. The method of claim 4, wherein the tackifying agent is at least partially coated onto the micro-proppant particulates.

6. The method of claim 1, wherein the IMA treatment fluid further comprises a co-surfactant.

7. The method of claim 1, further comprising a wellhead with a tubular extending therefrom and into the subterranean formation, and a pump fluidly coupled to the tubular, wherein step (a) comprises introducing the IMA treatment fluid through the tubular.

8. A method comprising:
(a) introducing a pad fluid into a subterranean formation at a rate and pressure sufficient to create or enhance a fracture in a first treatment interval therein,
wherein the subterranean formation has a permeability of about 0.001 milliDarcy or less;
(b) introducing an invert microemulsified acid ("IMA") treatment fluid into the fracture in the first treatment interval,
wherein the IMA treatment fluid comprises a surfactant, a non-aqueous external phase, and aqueous dispersed phase droplets, and
wherein the non-aqueous external phase further comprises micro-proppant particulates and at least a portion of the aqueous dispersed phase droplets further comprise an acid;
(c) destabilizing the IMA treatment fluid in the fracture, thereby exposing the acid and the micro-proppant particulates,
wherein the micro-proppant particulates form a proppant pack in the at least one fracture and the acid etches channels in the at least one fracture and/or adjacent to the at least one fracture after the IMA treatment fluid is destabilized, wherein the micro-proppant particulates have a size of less than about 60 µm,
wherein the formed proppant pack increases the permeability of the subterranean formation.

9. The method of claim 8, further comprising repeating steps (a) through (c) at least a second treatment interval.

10. The method of claim 8, wherein the aqueous phase dispersed droplets have an average diameter in the range of from about 1 nm to about 100 nm.

11. The method of claim 8, wherein the non-aqueous external phase further comprises a tackifying agent.

12. The method of claim 11, wherein the tackifying agent is at least partially coated onto the micro-proppant particulates.

13. The method of claim 8, wherein the IMA treatment fluid further comprises a co-surfactant.

14. The method of claim 8, further comprising a wellhead with a tubular extending therefrom and into the subterranean formation, and a pump fluidly coupled to the tubular, wherein step (a) comprises introducing the pad fluid through the tubular, and/or step (b) comprises introducing the IMA treatment fluid through the tubular.

15. A method comprising:
   introducing an invert microemulsified acid ("IMA") treatment fluid into a subterranean formation,
      wherein the IMA treatment fluid comprises a surfactant, a non-aqueous external phase, and aqueous dispersed phase droplets, wherein the aqueous phase dispersed droplets have an average diameter in the range of from about 1 nm to about 9 nm,
      wherein the non-aqueous external phase further comprise micro-proppant particulates and at least a portion of the aqueous dispersed phase droplets further comprise an acid,
   destabilizing the IMA treatment fluid within the subterranean formation, thereby exposing the acid and the micro-proppant particulates,
      wherein the micro-proppant particulates form a proppant pack within the subterranean formation and the acid etches channels within the subterranean formation after the IMA treatment fluid is destabilized,
      wherein the formed proppant pack increases the permeability of the subterranean formation,
      wherein the IMA treatment fluid further comprises the surfactant and a co-surfactant, wherein the micro-proppant particulates have a size of less than about 80 μm.

16. The method of claim 15, wherein at least a portion of the aqueous dispersed phase droplets further comprise a low-molecular weight polymer having a molecular weight in the range of between about 500 daltons to about 50,000 daltons.

17. The method of claim 15, wherein the non-aqueous external phase further comprises a tackifying agent.

18. The method of claim 17, wherein the tackifying agent is at least partially coated onto the micro-proppant particulates.

* * * * *